UNITED STATES PATENT OFFICE.

JOHANNES PETRUS VAN BALGOOY, OF WEERT, THE NETHERLANDS.

COATING FOR CEILINGS AND WALLS.

SPECIFICATION forming part of Letters Patent No. 467,271, dated January 19, 1892.

Application filed July 17, 1891. Serial No. 399,852. (No specimens.)

*To all whom it may concern:*

Be it known that I, JOHANNES PETRUS VAN BALGOOY, a subject of the Queen of Holland, and a resident of Weert, in the Province of Limburg, in the Kingdom of Holland, have invented a new and Improved Coating for Ceilings and Walls, of which the following is a specification.

This invention relates to an improved coating for ceilings and walls which excludes moisture and presents a smooth surface that allows the water to run down freely.

The coating is applied in two layers, of which the lower layer is in the form of a thick solution, while the upper layer is in the form of a thin solution.

The first solution is prepared as follows: about five parts of stearine, saponified with caustic potash, are mixed with about two parts of acetic acid, one part, or less, of salicylic acid, and about ninety-two parts of water. The whole is heated in a water-bath to the boiling-point. The mixture is then allowed to cool and is ready to be applied. If desired, a little coloring-matter and a little phenic acid may be added, the latter to neutralize the unpleasant odor of the soap.

The second solution is composed of about 7.5 parts of alum or chloride of calcium, 0.5 part of salicylic acid, and ninety-two parts of water. To this solution also there may be added a little coloring-matter and phenic acid.

In use the first solution is applied to the surface of the wall by a brush or otherwise and allowed to dry, after which the second solution is applied.

A wall coated in the above manner is impervious to water, while at the same time the coating is entirely smooth and will last for an indefinite time.

What I claim is—

A composition of matter consisting of saponified stearine, acetic acid, salicylic acid, and alum, substantially in the proportions specified.

In testimony that I claim the foregoing as my invention I have signed my name, in presence of two witnesses, this 26th day of June, 1891.

JOHANNES PETRUS VAN BALGOOY.

Witnesses:
RUTGER WILLEM HERMAN PITLO,
HENDRIK JAN DE GREEF.